United States Patent
Järvenpää

(10) Patent No.: US 6,576,031 B1
(45) Date of Patent: Jun. 10, 2003

(54) DROPLET SEPARATOR INCLUDING A FLOW TUBE, AND A DROPLET SEPARATION TUBE SURROUNDING A PORTION OF THE FLOW TUBE

(76) Inventor: Viljo Järvenpää, Vellamontie 21 as 6, FIN-04230 Kerava (FI)

( * ) Notice: Subject to any disclaimer, the term of this patent is extended or adjusted under 35 U.S.C. 154(b) by 0 days.

(21) Appl. No.: 09/889,529
(22) PCT Filed: Jan. 18, 2000
(86) PCT No.: PCT/FI00/00035
§ 371 (c)(1), (2), (4) Date: Oct. 3, 2001
(87) PCT Pub. No.: WO00/43099
PCT Pub. Date: Jul. 27, 2000

(30) Foreign Application Priority Data

Jan. 19, 1999 (FI) .................................................. 990104

(51) Int. Cl.$^7$ ........................... B01D 45/00; B01D 47/06
(52) U.S. Cl. ............................. 55/394; 55/447; 55/457; 55/428; 96/355; 261/116
(58) Field of Search ........................... 55/394, 396, 428, 55/447, 457; 96/322, 355; 261/116

(56) References Cited

U.S. PATENT DOCUMENTS

| | | | |
|---|---|---|---|
| 2,193,883 A | * | 3/1940 | Reeves .......................... 55/337 |
| 3,964,884 A | * | 6/1976 | Judith et al. ................... 55/340 |
| 4,057,075 A | | 11/1977 | Muschelknautz et al. ... 137/171 |
| 4,255,174 A | | 3/1981 | Simpson ....................... 55/347 |

FOREIGN PATENT DOCUMENTS

| EP | 0495304 | 7/1992 |
|---|---|---|
| GB | 2019748 | 11/1979 |

* cited by examiner

Primary Examiner—Robert A. Hopkins
(74) Attorney, Agent, or Firm—Steinberg & Raskin, P.C.

(57) ABSTRACT

The invention relates to a droplet separator for separating liquid droplets as well as the solid matter and condensate associated therewith from a gas flow (a) brought into rotary motion. The droplet separator (1) comprises a gas flow duct (11, 13, 15) and a droplet separation tube (12) surrounding it. The gas flow duct is formed of three successive parts placed at a distance from one another in the direction of flow, which parts are a flow tube (11), a cone part (13) tapering in the direction of flow, and a continuation tube (15). The diameter of the front end of the cone part (13) is smaller than the diameter of the flow tube (11) and the rear end thereof is at a suitable distance from the continuation tube (15). Flow gaps are formed between said successive parts (11, 13, 15) of the flow duct, which gaps provide an open flow connection between the flow duct and the droplet separation tube. The outermost layer (c) of the gas flow (a) is passed through the first gap from the flow duct (11) into the droplet separation tube (12) for separating the droplets, and the gas flow made free from droplets is passed through the second gap from the droplet separation tube (12) back into the flow duct (15).

10 Claims, 3 Drawing Sheets

DROPLET SEPARATOR INCLUDING A FLOW TUBE, AND A DROPLET SEPARATION TUBE SURROUNDING A PORTION OF THE FLOW TUBE

FIELD OF THE INVENTION

The invention relates to a droplet separator for separating liquid droplets as well as the solid matter and condensate associated therewith from a gas flow brought into rotary motion, which droplet separator comprises a gas flow duct and a droplet separation tube surrounding it, and in which the outermost layer of the gas flow is arranged to be passed from the flow duct into the droplet separation tube for separating the droplets, and the gas flow made free from droplets is arranged to be passed from the droplet separation tube back into the flow duct.

BACKGROUND OF THE INVENTION

Liquid in droplet form is often present in gas flows, which liquid is desired to be removed. The removal of droplets is necessary particularly when a gas flow is blown out. The liquid droplets flying out of a flow tube contaminate the surroundings depending on the velocity of exhaust either in the immediate surroundings of an exhaust pipe or chimney, or in the case of a high chimney, even at a distance.

Different materials made of porous materials have been used for separating liquid droplets from a gas flow. There are known plugs of suitably close or open structure, made of natural fibres, metal wire or different plastic fibres, which plugs are placed in a flow duct. There are also known metal or plastic sieves placed one upon the other or plate packages made of perforated plates, the aim of which is to cause liquid to be separated from gas onto the surfaces of a droplet separator while the gas flow has to make rapid changes in the direction of flow. The sharper the changes of direction the gas flow must make and the higher the number of the slot or plate openings through which it must flow, the better the liquid droplets will be separated. These known separators suffer from the drawback of being clogged for two reasons. One reason is the dust and solid matter particles possibly present in the gas flow. The other reason is the crystallization phenomenon, which results from the fact that supersaturated liquid drops are formed on the surfaces of the droplet separator, from which drops solid matter causing clogging begins to crystallize onto the openings and/or walls of the droplet separator.

One known problem-solution is the so-called Euroform plate arrangement, in which gas starts a laminar flow after the edge of the plates situated in close overlapping relationship. The surface of flow is provided with an elongated pocket extending transversely to the direction of flow, into which pocket the liquid or liquid drop present in the gas flow falls because of its specific gravity. Since this groove is further at an oblique angle with respect to the gas flow, the liquid separated from it is guided along the groove to one end thereof, from which it is guided to an outlet, and the gas free from droplets continues its flow. The drawback of this arrangement is also that the grooves are filled up because of the solid matter which is contained in the gas or which crystallizes from the liquid. This means that the gas flows through the entire plate package without the droplets being separated because the grooves intended to separate the droplets have clogged up.

In most cases, static droplet separators do not function satisfactorily at least in conditions in which there is a risk of clogging or of the grooves being filled because of the solid matter content of the gas flow or if the liquid droplets in question have a tendency to form supersaturated and crystallizing concentrations in separated droplets.

Consequently, there is a need to find other solutions for the separation of droplets. One such solution is a cyclone separator. It operates fairly well if the gas flow contains enough droplets, which are washing the inner surface of the cyclone all the time preventing solid matter from sticking to the inner walls of the cyclone. The drawback of the cyclone separator is, however, limited droplet sizes. Mists and vapours smaller than a given separation threshold, which mists and vapours can be separated by means of the above-mentioned fibre bed filters, pass through the cyclone separator. The other drawbacks of the cyclone separator include its large size and the need to place the cyclone in an upright position.

An object of the invention is to reduce the problems associated with the known droplet separators.

A further object of the invention is to provide a droplet separator which operates without trouble not only in the conditions described above but also in conditions in which a high exhaust chimney may cause a liquid to be condensed from supersaturated gas. This kind of situation is often encountered, for example, in high uninsulated chimneys of wet washers particularly in winter, when the cold walls of the chimney cause condensation of the liquid contained in the gas flow. If there is no droplet separator at the end of the chimney, droplets and condensed liquid visibly flow along the outer wall of the chimney forming dirty streaks, and condensate droplets also often fly to the surroundings of the chimney.

SUMMARY OF THE INVENTION

The droplet separator according to the invention is characterized in that a gas flow duct is formed of three successive parts placed at a distance from one another in the direction of flow, which parts are a flow tube, a cone part tapering in the direction of flow, and a continuation tube, the diameter of the front end of said cone part being smaller than the diameter of the flow tube and the rear end thereof being at a suitable distance from the continuation tube, whereby flow gaps are formed between said successive parts of the flow duct, which gaps provide an open flow connection between the flow duct and a droplet separation tube.

The droplet separator according to the invention is suitable for separation of liquid from gas which flows in a horizontal, oblique or vertical tube, in which connection the droplet separator may be situated in the middle of the flow tube or at its end. The gas and the additional liquid possibly fed into it are brought into a rotating flow motion before the droplet separator in order to produce a centrifugal field in the gas flow such that the droplets and liquid heavier than the gas are caused to flow with the gas along the inner wall of the flow tube. The main part of the gas flow entering the droplet separator enters the tapering cone part, the front end of which is smaller in diameter than the flow tube of gas and which is situated at a small distance from the end of said flow tube, whereby a gap is formed between the end of the flow tube and the front end of the cone part. Through said gap, part of the gas containing liquid and flowing along the outer wall of the flow tube can flow as a thin ring into an expansion part which is situated outside the cone part and in which the liquid and droplets are separated from the gas flow. If the flow tube is in an upright position, the separated liquid returns from an annular collecting space situated outside the flow tube through openings provided in the walls of the flow tube back into the tube in which it flows down along the inner surface of the flow tube. If the flow tube is inclined or in a horizontal position, the tube is provided with a separate opening through which the liquid is passed out.

BRIEF DESCRIPTION OF THE DRAWINGS

In the following, the invention will be described with reference to FIGS. 1–3 of the accompanying drawings, to the details of which the invention is, however, not intended to be narrowly confined.

DETAILED DESCRIPTION OF THE INVENTION

Figure 1:
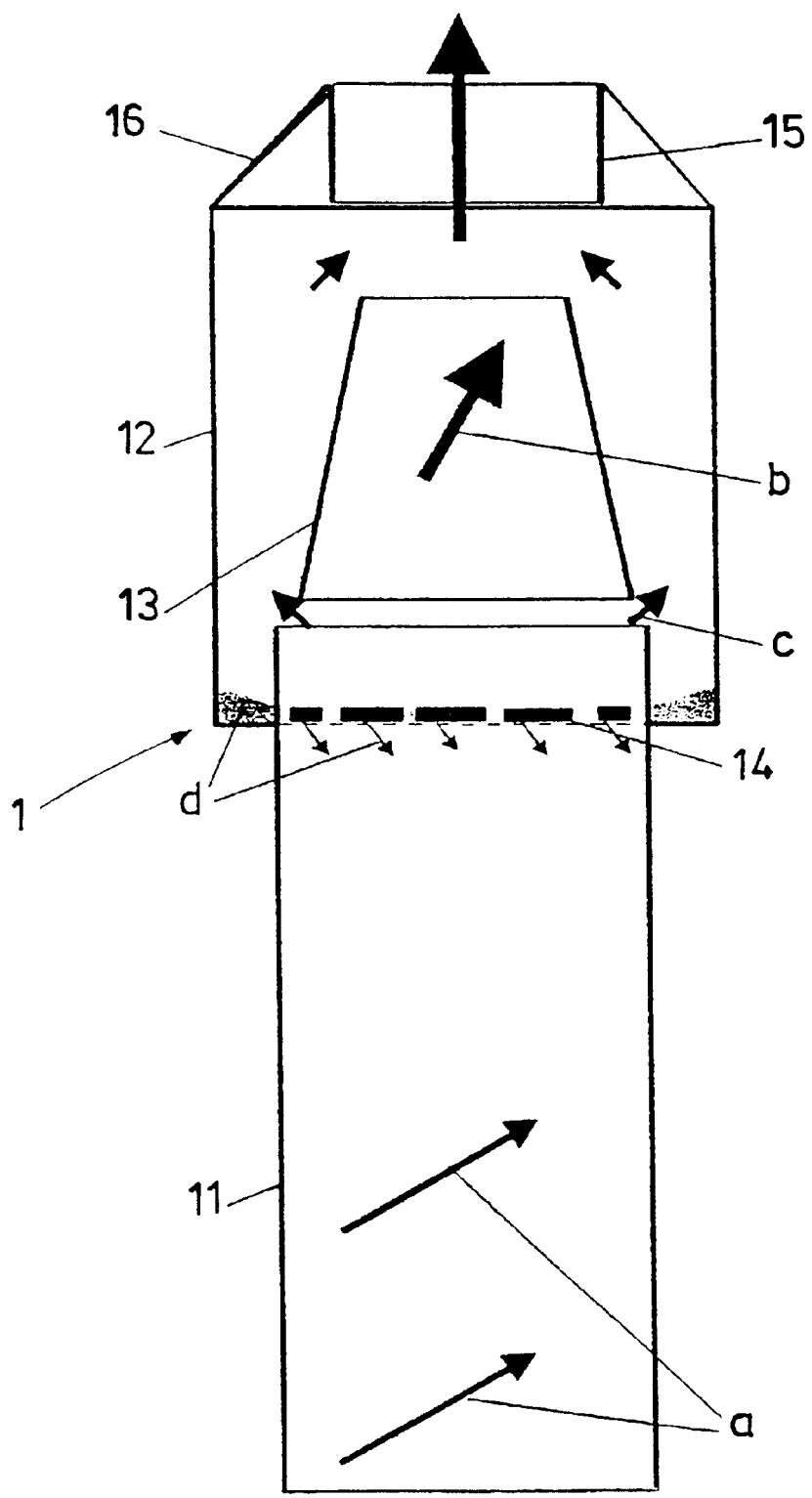
FIG. 1 shows a droplet separator placed at the end of a vertical flow tube.

FIG. 1 shows a gas flow tube 11 placed in an upright position, from which tube a gas flow is discharged out through a droplet separator 1. Inside the flow tube 11, the gas flow a moves forward in a rotating motion which is produced in a manner known in itself. The droplet separator 1 is attached to the end of the flow tube 11, which droplet separator comprises a cone part 13 tapering in the direction of flow and a droplet separation tube 12 surrounding the cone part. The cone part 13 is placed after the flow tube 11 at a small distance from its mouth opening and the diameter of its inlet opening directed towards the flow tube 11 is smaller than the diameter of the flow tube 11, so that between the flow tube 11 and the cone part 13 there is left an annular gap which extends both in the flow direction and in a direction transverse to the flow. The diameter of the droplet separation tube 12 is larger than the diameter of the flow tube 11 and it is connected to the flow tube 11 by means of a flange at a small distance from the mouth opening of the tube 11 such that there remains an annular space between the end portion of the flow tube 11 and the droplet separation tube 12. In the wall of the flow tube 11 there are a number of openings 14 slightly above the plane in which the droplet separation tube 12 joins the flow tube 11. The droplet separation tube 12 extends in the flow direction over the entire length of the cone part 13 and its outer end in the flow direction tapers into a cone 16, in the middle of which a continuation tube 15 begins.

The liquid mainly in droplet form travelling with the gas flowing in rotary motion in the flow tube 11 is caused to pass by the action of a centrifugal field onto the inner walls of the flow tube 11, on which it flows as a thin film onwards. The flow profile of the gas in the tube is, as known, in the shape of a truncated bung such that the velocity of flow is lower on the inner surface of the tube than in the middle of the tube. After the termination of the flow tube 11, the main part of the gas flow a continues its flow into the cone part 13 following at a small distance from the tube 11 as a flow b, whose flow velocity increases in the cone part 13 as the cross-sectional area of the flow decreases. The outermost layer of the gas flow a flowing close to the walls of the flow tube 11 exits through the annular gap formed between the flow tube 11 and the cone part 13 into the droplet separation tube 12 as a flow c. Between the droplet separation tube 12 and the cone part 13 there is an annular flow space which widens in the flow direction and in which the velocity of flow of the gas is substantially lower than in the flow tube 11. As a result of this, the liquid droplets and other heavier material contained in the gas flow can become separated from the gas flow and drop to the bottom of the droplet separation tube 12 as a liquid d, which flows further through the openings 14 back into the flow tube 11. Here, the liquid flow d is so strong that it may flow downwards along the walls of the flow tube 11 in a direction opposite to the direction of the gas flow a.

The main part of the gas flow a discharged from the flow tube 11 thus flows through the cone part 13 at increasing velocity as the flow b and from there further into the continuation tube 15 and possibly into the open air. Between the cone part 13 and the continuation tube 15 there is a gap through which the gas flow c which has circulated through the droplet separation tube 12 and which has become free from liquid droplets and solid matter can join the main flow b of the gas. The gas flow b discharged at high velocity from the cone part 13 ejects with it the gas flow c circulated through the droplet separation tube 12. On the other hand, the liquid droplets condensed by the action of the rotary motion of the gas in the cone part 13 can fly through said gap into the droplet separation tube 12 and thus get among the droplets to be removed. The tapering annular cone space left between the cone 16 provided as the continuation of the droplet separation tube 12 and the continuation tube 15 ensures that the liquid is separated from the gas flowing in the droplet separation tube 12.

Figure 2:
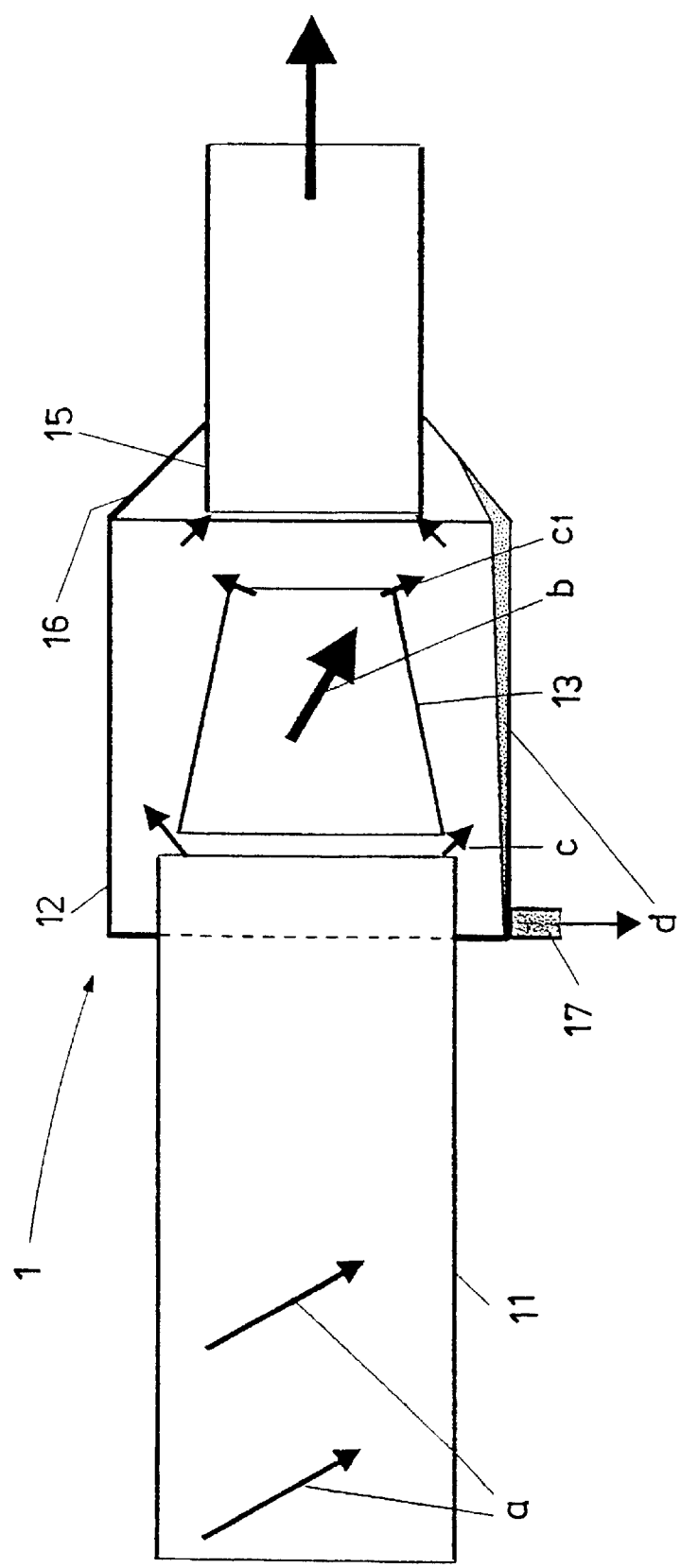
FIG. 2 shows a droplet separator placed in connection with a gas flow advancing in a horizontal position.

In FIG. 2, a droplet separator 1 is placed between a flow tube 11 and its continuation tube 15 situated in a horizontal position. The structure and the operation of the droplet separator 1 are mainly similar to those of the arrangement placed in an upright position as shown in FIG. 1. A gas flow a brought into rotary motion is divided into two portions after the flow tube 11. The bulk b of the gas flow continues its flow into a tapering cone part 13 and from there further into the continuation tube 15. The heaviest part c of the gas flow, which flows closest to the walls of the flow tube 11, discharges through a gap between the flow tube 11 and the cone part 13 into a droplet separation space between a droplet separation tube 12 and the cone part 13. Here the gas flow c decelerates and liquid d is separated dropping to the bottom of the flow space, from which it is arranged to exit through an outlet duct 17. Between the outer end of the cone part 13 and the continuation tube 15 there is left a gap, at the front edge of which liquid droplets c1 further separated by the action of the rotary motion of the gas in the cone part 13 fly into the droplet separation tube 12 and through it among the liquid d to the removed. At the rear edge of the gap, the gas flow which has circulated through the droplet separation tube 12 and which has been made there free from droplets, joins the main flow b entering the continuation tube 15.

Figure 3:
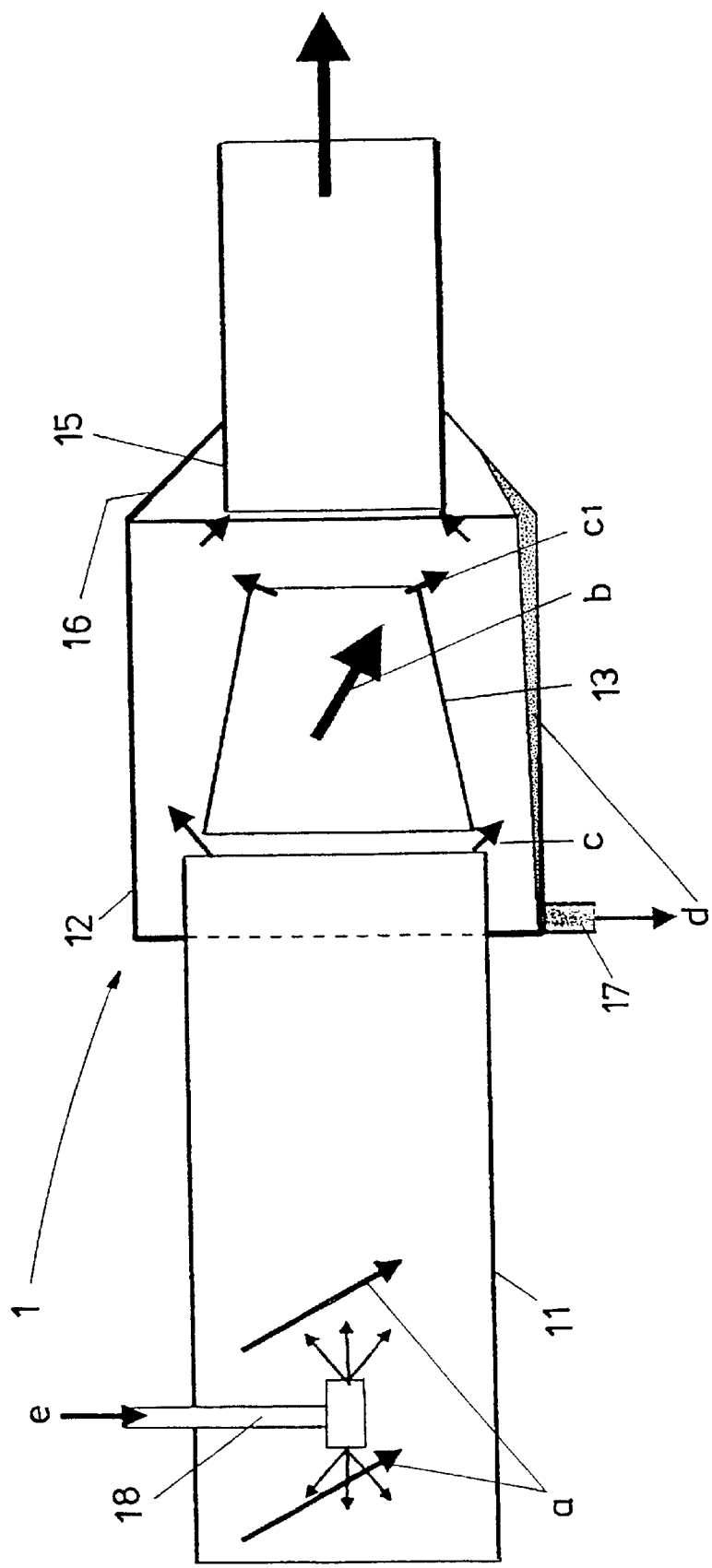
FIG. 3 shows a droplet separator in which additional liquid is sprayed into a flow of gas to wash the gas.

FIG. 3 also depicts a droplet separator placed in a horizontal position. Spray means 18 are placed before the droplet separator 1 in a flow tube 11, by means of which spray means additional liquid e is sprayed into a gas flow a in order to wash the gas. The washing liquid e is removed in the above-noted manner from the gas flow in the droplet separator 1 and, in this way, it is possible to separate from the gas flow not only the liquid droplets present in it but also the solid matter and other impurities possibly present in the gas flow. By the addition of the washing liquid it is also possible to prevent possible solid matter residues from adhering and sticking to the droplet separation tube 12.

The inventive solution is clear in structure, operative in practice and requires fairly little energy in terms of flow technology. The pressure loss caused by the droplet separator is generally of the order of 500–2000 Pa. When the droplet separator according to the invention is placed at the end of a vertical chimney, the end of the chimney can be kept clean without droplets flying out.

There may be several variations of the invention. For example, the cone 16 provided as a continuation of the droplet separation tube 12 may be absent altogether.

What is claimed is:

1. A droplet separator for separating liquid droplets as well as the solid matter and condensate associated therewith from a gas flow (a) brought into rotary motion, comprising:

a gas flow duct (11, 13, 15);

a droplet separation tube (12) surrounding said gas flow duct, and in which the outermost layer (c) of the gas flow (a) is arranged to be passed from the flow duct (11) into the droplet separation tube (12) for separating the droplets, and the gas flow made free from droplets is arranged to be passed from the droplet separation tube (12) back into the flow duct (15), wherein the gas flow duct is formed of three successive parts placed at a distance from one another in the direction of flow, which parts are a flow tube (11), a cone part (13) having a front end and a rear end, said cone part tapers in the direction of flow, and a continuation tube (15), the diameter of the front end of said cone part (13) being smaller than the diameter of the flow tube (11), whereby flow gaps are formed between said flow tube and said front end of said cone part and between said rear end of said cone part and said continuation tube, said flow gaps provide an open flow connection between the flow duct and the droplet separation tube.

2. A droplet separator as claimed in claim 1, wherein a conically widening annular droplet separation space is formed between the cone part (13) and the droplet separation tube (12) surrounding said cone part, which space ends in a cone (16) situated at the end of the droplet separation tube (12) and surrounding the continuation tube (15), the function of said cone (16) being to prevent the entry of droplets into the gas flow flowing into the continuation tube (15).

3. A droplet separator as claimed in claim 1, wherein at least one outlet opening (14) is arranged in the walls, defining a space, formed between the droplet separation tube (12) and the flow duct (11, 13, 15) in order to remove from said space the liquid (d) separated from the gas flow.

4. A droplet separator as claimed in claim 3, wherein said droplet separator is placed in connection with a flow tube (11) situated in an upright position, and openings (14) are formed in the wall of the flow tube (11) at the droplet separation tube (12), through which openings the liquid (d) separated from the gas flow (c) is able to flow back into the flow tube (11).

5. A droplet separator as claimed in claim 1, wherein members (18) are connected to the flow tube (11) for spraying additional liquid (e) into the gas flow (a).

6. A droplet separator as claimed in claim 1, wherein at least one outlet duct (17) is arranged in the walls, defining a space, formed between the droplet separation tube (12) and the flow duct (11, 13, 15) in order to remove from said space the liquid (d) separated from the gas flow.

7. A droplet separator for separating liquid droplets from a gas flow, said droplet separator comprising:

a gas flow duct;

a droplet separation tube in communication with said gas flow duct, said droplet separation tube structured and arranged so that it at least partially surrounds said gas flow duct;

wherein said gas flow duct includes a flow tube, a cone part in flow communication with said flow tube and a continuation tube in flow communication with said cone part, said cone part having a front open end having a diameter smaller than a diameter of said flow tube and rear open end, said cone part being tapered in a direction of flow, said flow tube, cone part and continuation tube being structured and arranged so that within said droplet separation tube a first gap is defined between a terminal end of said flow tube and said front open end of said cone part and a second gap is defined said rear open end of said cone part and said continuation tube.

8. The droplet separator of claim 7, wherein said droplet separation tube is provided with at least one outlet opening to remove liquid from said droplet separation tube.

9. The droplet separator of claim 8, wherein said at least one opening in said droplet separation tube is arranged to permit the flow of liquid into said flow tube.

10. The droplet separator of claim 7, further comprising means for spraying liquid into said gas flow in said flow tube.

* * * * *

UNITED STATES PATENT AND TRADEMARK OFFICE
CERTIFICATE OF CORRECTION

PATENT NO.    : 6,576,031 B1
DATED         : June 10, 2003
INVENTOR(S)   : Viljo Järvenpää

It is certified that error appears in the above-identified patent and that said Letters Patent is hereby corrected as shown below:

<u>Title page,</u>
Below item [76], Inventor, insert the following:

-- [73] Assignee: Wiser Oy, Kerava (FI) --.

Signed and Sealed this

Twenty-third Day of September, 2003

JAMES E. ROGAN
*Director of the United States Patent and Trademark Office*